United States Patent
Dowdy

[19]

[11] Patent Number: 5,857,230
[45] Date of Patent: Jan. 12, 1999

[54] COMBINATION MOTORCYCLE HAMMOCK AND JACK

[76] Inventor: James H. Dowdy, 12 Geiger Ave., Alliance, Ohio 44601

[21] Appl. No.: 892,829

[22] Filed: Jul. 15, 1997

[51] Int. Cl.$^6$ ............................................ A45F 3/22
[52] U.S. Cl. ................................ 5/118; 5/127; 280/295
[58] Field of Search ........................ 5/118, 119, 127; 280/292, 293, 295, 298, 301

[56] References Cited

U.S. PATENT DOCUMENTS

| | | | |
|---|---|---|---|
| D. 331,158 | 11/1992 | Hooi | D6/499 |
| D. 342,841 | 1/1994 | Companello | D6/387 |
| D. 343,318 | 1/1994 | Curitti | D6/503 |
| 1,143,780 | 6/1915 | Pinto | 280/298 |
| 1,357,890 | 11/1920 | Mohr | 280/301 |
| 1,791,738 | 10/1931 | Moffett | 5/127 X |
| 2,524,499 | 10/1950 | Weir | 5/119 X |
| 4,114,633 | 9/1978 | Herbez | 135/1 A |
| 4,797,961 | 1/1989 | Pasquariello | 5/127 |
| 5,170,521 | 12/1992 | Light | 5/118 |
| 5,392,476 | 2/1995 | Williams | 5/127 |

*Primary Examiner*—Michael F. Trette
*Attorney, Agent, or Firm*—Oldham & Oldham Co., L.P.A.

[57] ABSTRACT

A combination motorcycle hammock and jack which, when used as a hammock, includes a cargo carrier rack support structure preferably attached to the cargo carrier rack of a motorcycle, an outwardly extending motorcycle hammock extension arm, a vertical support member and a lightweight flexible fabric material stretched from the outwardly extending motorcycle hammock extension arm to, for example, opposing handlebars of the motorcycle. Alternatively, the cargo carrier rack support structure could be placed underneath the motorcycle frame and the motorcycle hammock extension arm could be pivoted downwardly about a fulcrum to act as a lever and cause the motorcycle cargo carrier rack support structure to lift and support at least a portion of the motorcycle to permit, for example, repair and/or replacement of a flat tire. When not in use, the motorcycle cargo carrier rack support structure, the motorcycle hammock extension arm, the vertical support member and the flexible hammock support material is capable of being transported and/or stored in a compact lightweight configuration.

20 Claims, 2 Drawing Sheets

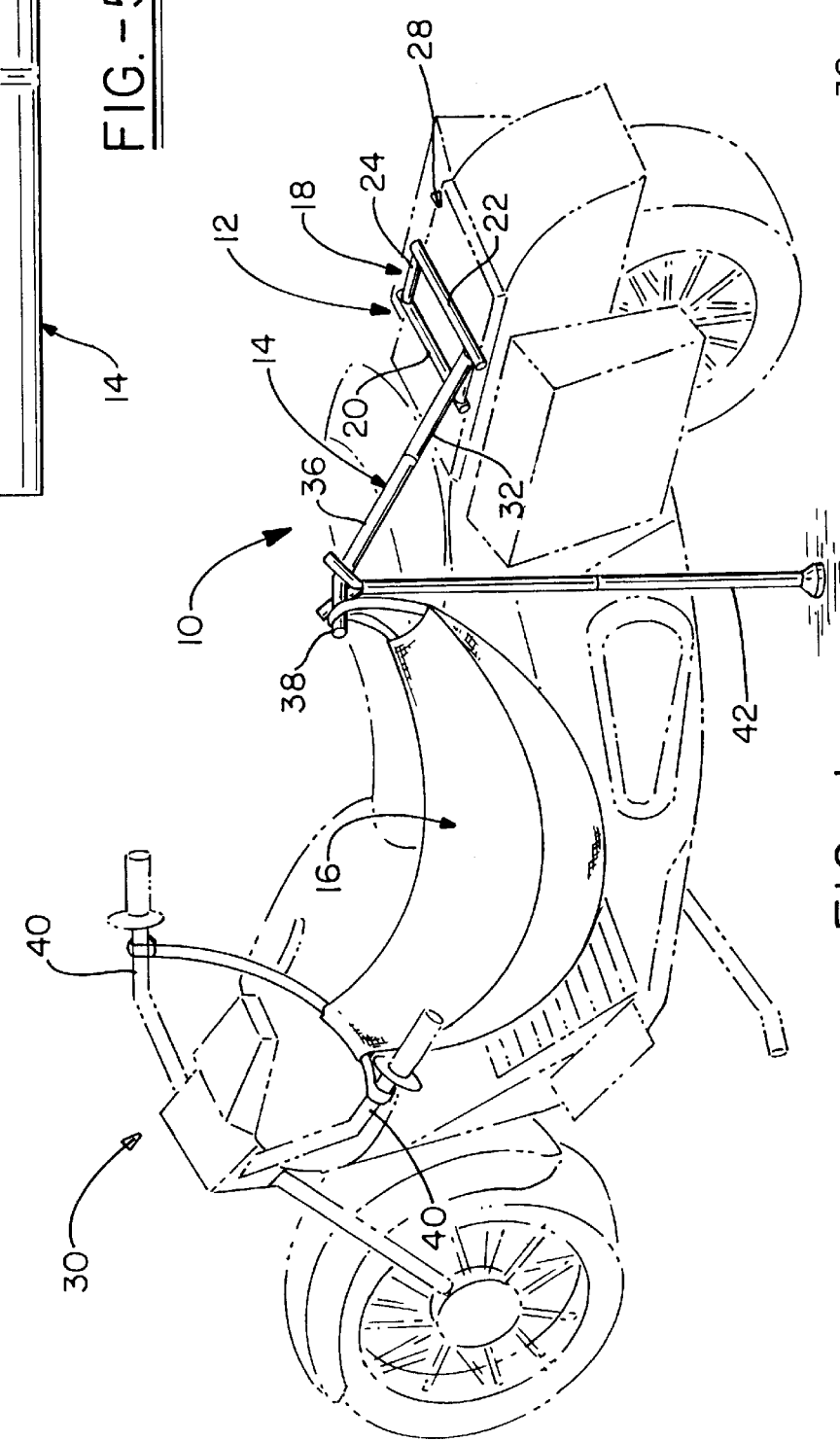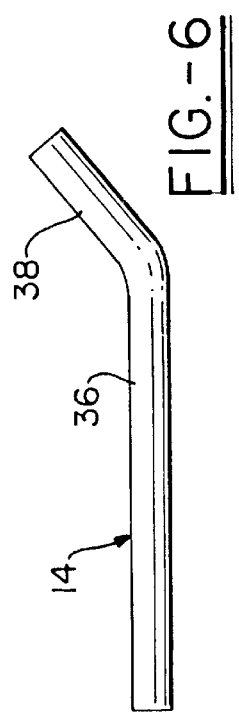

COMBINATION MOTORCYCLE HAMMOCK AND JACK

BACKGROUND AND SUMMARY OF THE INVENTION

The present invention relates generally to new and novel improvements in a combination motorcycle hammock and jack. More particularly, the present invention relates to a combination motorcycle hammock and jack which, when disassembled, is compact and lightweight and which attaches to a motorcycle to provide a comfortable hammock for relaxing and resting and which can also be used as a jack to lift and support at least a portion of a motorcycle to, for example, repair and/or replace a flat tire.

When taking long motorcycle trips, a motorcyclist will often become uncomfortable sitting in the same position in a motorcycle seat for extended periods of time and, for reasons of health and safety, it is beneficial to occasionally take breaks and rest. When taking a break and resting, it is beneficial to relax in a position other than the sitting position in the motorcycle seat. While when in an automobile, it is generally possible to pivot the automobile seat to a more horizontal position or lay across the seat in order to lie down and relax, such adjustments are generally not possible in a motorcycle seat. Accordingly, park benches, picnic tables and the such have been used by motorcyclists as horizontal surfaces on which to lie down and rest. However, these are not always available, and even if they are, they provide, in most cases, a hard horizontal surface which does not provide as comfortable of a resting position as is desirable.

In addition, occasionally on motorcycle trips, it becomes necessary to lift and support at least a portion of the motorcycle to, for example, repair or replace a flat tire. Since motorcycles, by their nature, have limited storage capacity, most motorcyclists do not carry a jack which can be used to lift and support at least a portion of their motorcycles, if it would become necessary or desirable to do so.

Accordingly, an object of the present invention is the provision of a combination motorcycle hammock and jack which, when disassembled, is lightweight and compact and can be readily transported on a motorcycle.

Another object of the present invention is to provide a combination motorcycle hammock and jack which can be readily converted from a disassembled configuration to a hammock configuration attached to a motorcycle to create a comfortable hammock or alternatively to a motorcycle jack configuration to lift and support at least a portion of the motorcycle thereon.

Yet another object of the present invention is to provide a combination hammock and jack which is easy to use and transport and provides the combined function of providing a hammock which can be readily assembled and attached to a motorcycle and a jack which can be used to lift and support at least a portion of the motorcycle to permit, for example, repair and/or replacement of a flat tire.

These and other objects of the present invention are attained by the provision of a combination motorcycle hammock and jack which, when used as a hammock, includes a motorcycle cargo carrier rack support structure preferably attached to the cargo carrier rack of a motorcycle, a motorcycle hammock extension arm extending therefrom, a vertical support member and a lightweight flexible hammock support material stretched between, for example, the motorcycle hammock extension arm and opposing handlebars of the motorcycle. Alternatively, the cargo carrier rack support structure can be placed underneath the motorcycle frame and the motorcycle hammock extension arm can be pivoted downwardly about a fulcrum to act as a lever and cause a portion of the motorcycle cargo carrier rack support structure to lift and support at least a portion of the motorcycle to permit, for example, repair and/or replacement of a flat tire. When not in use, the motorcycle cargo carrier rack support structure, the motorcycle hammock extension arm, the vertical support member and the flexible hammock support material are capable of being stored and/or transported in a compact lightweight configuration.

Other advantages and novel features of the present invention will become apparent in the following detailed description of the invention when considered in conjunction with the accompanying drawings.

BRIEF DESCRIPTION OF THE DRAWINGS

FIG. 1 is a perspective view of a combination motorcycle hammock and jack in accordance with a preferred embodiment of the present invention, showing the combination motorcycle hammock and jack assembled to a motorcycle in its hammock configuration.

FIG. 5 is a top view of a motorcycle hammock extension arm which is attached to the extending projection member shown in FIGS. 3 and 4 which extends from the motorcycle cargo rack support structure shown in FIG. 2 used in the combination motorcycle hammock and jack shown in FIG. 1.

FIG. 6 is a side view of motorcycle hammock extension arm shown in FIG. 5 which is attached to the extending projection member shown in FIGS. 3 and 4 which extends from the motorcycle cargo rack support structure shown in FIG. 2 used in the combination motorcycle hammock and jack shown in FIG. 1.

DETAILED DESCRIPTION OF THE DRAWINGS

Figure 2:
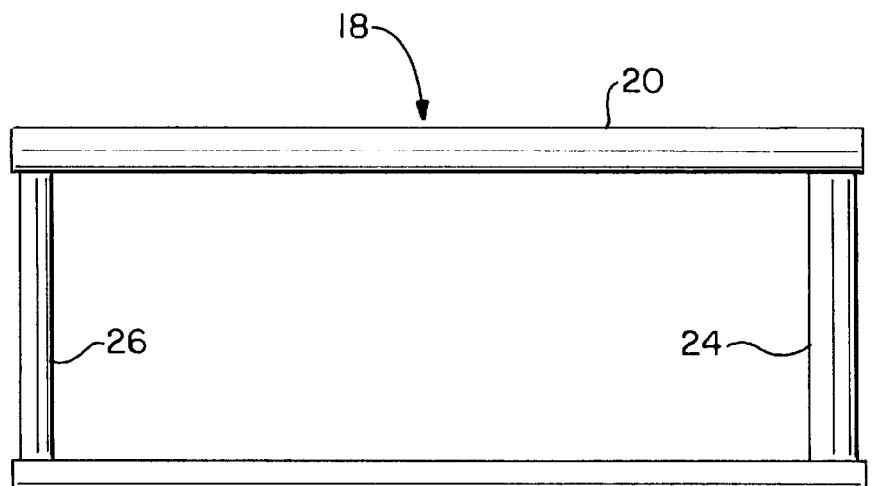
FIG. 2 is a top view of a motorcycle cargo rack support structure used in the combination motorcycle hammock and jack shown in FIG. 1.

In the following detailed description of a preferred embodiment of the present invention, reference is made to the accompanying drawings which, in conjunction with this detailed description, illustrate and describe a preferred embodiment of a combination motorcycle hammock and jack in accordance with the present invention. The combination motorcycle hammock and jack in accordance with the present invention, identified generally by reference numeral 10, generally includes motorcycle cargo rack support structure 12, motorcycle hammock extension arm 14 and flexible hammock support material 16. As seen in FIGS. 1 and 2, motorcycle cargo rack support structure 12 preferably consists of generally rectangular base member 18 having two elongated support members 20 and 22 and two cross members 24 and 26 extending across the ends of cross members 20 and 22. As seen in FIG. 1, elongated support members 20 and 22 and at least one of cross members 24 and 26, in this case, cross member 24 is attached to cargo rack 28 mounted on motorcycle 30.

Figure 3:
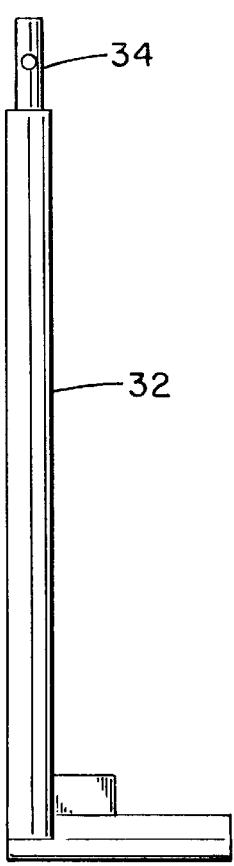
FIG. 3 is a top view of an extending projection member which extends from the motorcycle cargo rack support structure shown in FIG. 2 used in the combination motorcycle hammock and jack shown in FIG. 1.
Figure 4:
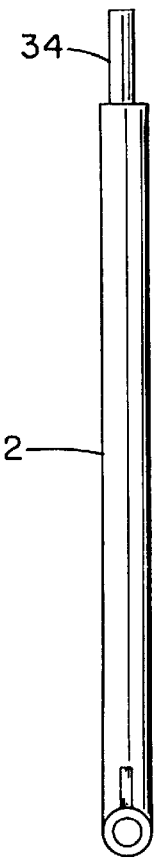
FIG. 4 is a side view of the extending projection member shown in FIG. 3 which extends from the motorcycle cargo rack support structure shown in FIG. 2 used in the combination motorcycle hammock and jack shown in FIG. 1.
Figure 7:
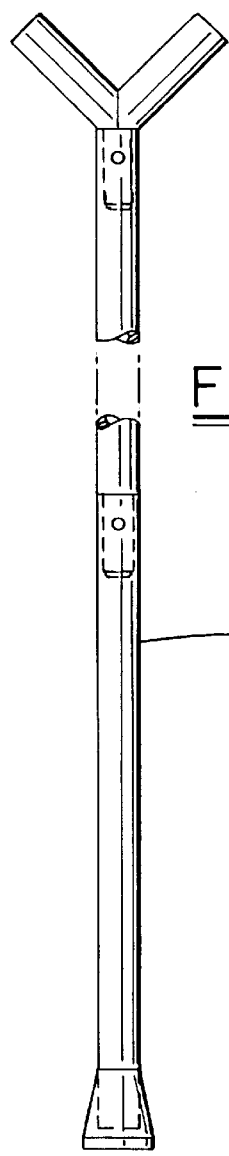
FIG. 7 is a side view of a vertical support member used in the combination motorcycle hammock and jack shown in FIG. 1.

Referring to FIGS. 1, 3 and 4, extending projection member 32 extends upwardly and outwardly from cross member 26. The end of extending projection member 32 distal from generally rectangular base member 18 preferably includes a reduced diameter portion 34 which engages with the inside diameter of motorcycle hammock extension arm 14. Elongated support members 20 and 22, cross members 24 and 26 and extending projection member 32 are preferably joined, for example by welding or with mechanical fasteners, together as an integral assembly and are fabricated from a strong economical material, most preferably steel, such as steel in a tubular form, although other materials could be used, including metals such as aluminum and stainless steel and polymers or composite materials.

As seen in FIGS. 1, 5 and 6, motorcycle hammock extension arm 14 generally includes substantially straight section 36 and shorter portion 38 which extends at an angle from substantially straight section 36. The end of substantially straight section 36 preferably has a hollow aperture which corresponds to reduced diameter portion 34 of extending projection member 32 to permit extending projection member 32 to engage and support substantially straight section 36 of motorcycle hammock extension arm 14 as shown in FIG. 1. Motorcycle hammock extension arm 14 is also preferably fabricated from a ductile strong economical material, most preferably steel, such as steel in a tubular form, although other materials could be used, including metals such as aluminum and stainless steel and high strength polymers and/or composite materials.

As seen in FIG. 1, once generally rectangular base member 18 of motorcycle cargo rack support structure 12 is secured to cargo rack 28 of motorcycle 30, motorcycle hammock extension arm 14 is placed on motorcycle cargo rack support structure 12 as shown. Flexible hammock support material 16 is then attached at one end to shorter portion 38 of motorcycle hammock extension arm 14 and the other end of flexible hammock support material 16 is attached to, for example, handlebars 40 of motorcycle 30. At this time, an individual can lay in flexible hammock support material 16 supported between motorcycle hammock extension arm 14 and handlebars 40 of motorcycle 30 as shown in FIG. 1. If desired, vertical support member 42, which is preferably of multiple piece construction, and most preferably is of three-piece construction, can be positioned below the distal end of motorcycle hammock extension arm 14 to provide additional support for flexible hammock support member 16. The upper end of vertical support member 42 preferably includes a yoke having a substantially "Y-shaped" configuration which engages and supports the distal end of motorcycle hammock extension arm 14.

Motorcycle cargo rack support structure 12 and motorcycle hammock extension arm 14 can also be utilized as a motorcycle jack for lifting and supporting at least a portion of motorcycle 30 to, for example, repair and/or replace a flat tire. Generally rectangular base member 18 is positioned below the portion of motorcycle 30 to be lifted or raised and motorcycle hammock extension arm 14 is attached to extending projection member 32 of motorcycle cargo rack support structure 12. Motorcycle hammock extension arm 14 is then pressed downward causing cross member 26 to act as the fulcrum of a lever raising the end of elongated support members 20 and 22 distal from cross member 26 and raising cross member 24 extending therebetween, thus raising at least a portion of motorcycle 30. It will be appreciated that the ratio between the length of elongated support members 20 and 22 and the length of extending projection member 32 of motorcycle cargo rack support structure 12 and motorcycle hammock extension arm 14 are such that the extent of downward force needed on shorter portion 38 of motorcycle hammock extension arm 14 is less than the force exerted in lifting at least a portion of motorcycle 30. These lengths can be adjusted as desired using the formula for a simple lever to optimize the amount of force necessary on shorter portion 38 of motorcycle hammock extension arm 14 to lift motorcycle 30 of a predetermined weight a predetermined distance.

It will be appreciated that when disassembled for storage and/or transport, motorcycle cargo rack support structure 12, motorcycle hammock extension arm 14, flexible hammock support material 16 and vertical support member 42 form a compact lightweight configuration and can be stored and/or transported on cargo rack 28 of motorcycle 30 or in saddle bags if they are present on motorcycle 30.

Although the present invention has been described above in detail, the same is by way of illustration and example only and is not to be taken as a limitation on the present invention. For example, a semi-rigid material could be utilized for flexible hammock support material to provide additional support, however some of the advantage of a compact lightweight disassembled configuration for transport and storage may be sacrificed. Accordingly, the scope and content of the present invention are to be defined only by the terms of the appended claims.

What is claimed is:

1. A combination motorcycle hammock and jack assembly, comprising:
   a motorcycle cargo rack support structure adaptable for attachment to a motorcycle, said motorcycle cargo support structure including a base portion and an extending projection member extending outwardly and upwardly from said base portion;
   a motorcycle hammock extension arm attached to said extending projection member distal from said base portion and extending outwardly and upwardly from said extending projection member; and
   a flexible hammock support material having a first end and a second end, said first end of said flexible hammock support material is attached to said motorcycle hammock extension arm distal from said extending projection member and said second end of said flexible hammock support material is attached to the motorcycle to form a hammock therebetween.

2. The combination motorcycle hammock and jack in accordance with claim 1, further including a vertical support member having a first end and a second end, said first end of said vertical support member is positioned under said motorcycle hammock extension arm distal from said extending projection member of said motorcycle cargo rack support structure and said second end of said vertical support member is placed on the ground.

3. The combination motorcycle hammock and jack in accordance with claim 2, wherein said first end of said vertical support member includes a yoke having a substantially "Y-shaped" configuration which engages and supports said motorcycle hammock extension arm distal from said extending projection member of said motorcycle cargo rack support structure.

4. The combination motorcycle hammock and jack in accordance with claim 3, wherein said vertical support member is of multiple piece construction and is capable of being disassembled for compact storage and transport.

5. The combination motorcycle hammock and jack in accordance with claim 1, wherein said base portion of said motorcycle cargo support structure is adaptable for attachment to a cargo rack mounted above the rear wheel of the motorcycle.

6. The combination motorcycle hammock and jack in accordance with claim 1, wherein said second end of said flexible hammock support material is attached to the handlebars of the motorcycle.

7. The combination motorcycle hammock and jack in accordance with claim 1, wherein said base portion of said motorcycle cargo rack support structure is substantially rectangular in configuration.

8. The combination motorcycle hammock and jack in accordance with claim 1, wherein said base portion of said motorcycle cargo rack support structure includes a first elongated support member and a second elongated support member forming two (2) sides thereof and a first cross member and a second cross member extending between and attached to said first elongated support member and said second elongated support member to form two (2) ends thereof and said extending projection member extends outwardly and upwardly from one of said first cross member and said second cross member.

9. The combination motorcycle hammock in accordance with claim 8, wherein said extending projection member distal from said base portion includes a reduced diameter portion and said motorcycle hammock extension arm includes a corresponding aperture and said reduced diameter portion of said extending projection member is inserted into said corresponding aperture in said motorcycle hammock extension arm to removably attach said motorcycle hammock extension arm to said extending projection member.

10. The combination motorcycle hammock in accordance with claim 9, wherein said motorcycle hammock extension arm distal from said extending projection member includes a shorter portion and said first end of said flexible hammock support material includes a loop and said loop of said flexible hammock support material is placed around said shorter portion of said motorcycle hammock extension arm to removably attach said first end of said flexible hammock support material to said motorcycle hammock extension arm.

11. A combination motorcycle hammock and jack assembly, comprising:
a motorcycle cargo rack support structure adaptable for attachment to a motorcycle, said motorcycle cargo support structure including a base portion and an extending projection member extending outwardly and upwardly from said base portion;
a motorcycle hammock extension arm attached to said extending projection member distal from said base portion and extending outwardly and upwardly from said extending projection member; and
a vertical support member having a first end and a second end, said first end of said vertical support member is positioned between said motorcycle hammock extension arm distal from said extending projection member and said second end of said vertical support member is placed on the ground; and
a hammock support material having a first end and a second end, said first end of said hammock support material is attached to said motorcycle hammock extension arm distal from said extending projection member and said second end of said hammock support material is attached to the motorcycle to form a hammock therebetween.

12. The combination motorcycle hammock and jack in accordance with claim 11, wherein said first end of said vertical support member includes a yoke having a substantially "Y-shaped" configuration which engages and supports said motorcycle hammock extension arm distal from said extending projection member of said motorcycle cargo rack support structure.

13. The combination motorcycle hammock and jack in accordance with claim 12, wherein said vertical support member is of three-piece construction and is capable of being disassembled for compact storage and transport.

14. The combination motorcycle hammock and jack in accordance with claim 11, wherein said second end of said hammock support material is attached to the handlebars of the motorcycle.

15. The combination motorcycle hammock and jack in accordance with claim 11, wherein said base portion of said motorcycle cargo rack support structure includes a first elongated support member and a second elongated support member forming two (2) sides thereof and a first cross members extending between and attached to said two (2) elongated support member and said second elongated support member to form two (2) ends thereof and said extending projection member extends outwardly and upwardly from one of said first cross member and said second cross member.

16. The combination motorcycle hammock and jack in accordance with claim 11, wherein said motorcycle cargo rack support structure, said motorcycle hammock extension arm and said vertical support member are fabricated from a steel material in tubular form.

17. A combination motorcycle hammock and jack assembly, comprising:
a motorcycle cargo rack support structure having a base portion including a first elongated support member and a second elongated support member forming two (2) sides thereof and a first cross member and a second cross member extending between and attached to said first elongated support member and said second elongated support member to form two (2) ends thereof and an extending projection member extending outwardly and upwardly from said second cross member, wherein said first cross member is adapted to contact and lift the frame of a motorcycle and said second cross member acts as a fulcrum of a lifting lever; and
a motorcycle hammock extension arm attached to said extending projection member distal from said second cross member and extending outwardly and upwardly from said base portion of said motorcycle cargo rack support structure.

18. The combination motorcycle hammock in accordance with claim 17, wherein said extending projection member distal from said base portion includes a reduced diameter portion and said motorcycle hammock extension arm includes a corresponding aperture and said reduced diameter portion of said extending projection member is inserted into said corresponding aperture in said motorcycle hammock extension arm to removably attach said motorcycle hammock extension arm to said extending projection member.

19. The combination motorcycle hammock in accordance with claim 18, wherein said motorcycle hammock extension arm distal from said extending projection member includes a shorter portion and said first end of said flexible hammock support material includes a loop and said loop of said flexible hammock support material is placed around said shorter portion of said motorcycle hammock extension arm to removably attach said first end of said flexible hammock support material to said motorcycle hammock extension arm.

20. The combination motorcycle hammock and jack in accordance with claim 17, wherein the total length of said extending projection member and said motorcycle hammock extension arm is greater than the distance separating said first cross member and said second cross member.

* * * * *